US010956307B2

(12) United States Patent
Isaak et al.

(10) Patent No.: US 10,956,307 B2
(45) Date of Patent: Mar. 23, 2021

(54) DETECTION OF CODE DEFECTS VIA ANALYSIS OF TELEMETRY DATA ACROSS INTERNAL VALIDATION RINGS

(71) Applicant: Microsoft Technology Licensing, LLC, Redmond, WA (US)

(72) Inventors: Donovan Allen Isaak, Kenmore, WA (US); Dmitry Valentinovich Kholodkov, Sammamish, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 38 days.

(21) Appl. No.: 16/128,744

(22) Filed: Sep. 12, 2018

(65) Prior Publication Data

US 2020/0081824 A1 Mar. 12, 2020

(51) Int. Cl.
*G06F 11/34* (2006.01)
*G06F 11/36* (2006.01)

(52) U.S. Cl.
CPC .................... *G06F 11/3672* (2013.01)

(58) Field of Classification Search
CPC .................... G06F 11/3672
See application file for complete search history.

(56) References Cited

U.S. PATENT DOCUMENTS 8,151,146 B2 4/2012 Ostrand et al.
9,626,277 B2 4/2017 Thangamani et al.
9,921,952 B2 3/2018 Dean et al.
10,102,114 B1 * 10/2018 Jing .................... G06F 11/3692
10,289,539 B1 5/2019 Arguelles et al.
2007/0168734 A1 7/2007 Vasile
2007/0226546 A1 9/2007 Asthana et al.
2011/0061041 A1 3/2011 Hellebro et al.
2014/0109053 A1 * 4/2014 Vasudevan .......... G06F 11/3664 717/124
2014/0325480 A1 10/2014 Bhagavatula
(Continued)

FOREIGN PATENT DOCUMENTS

WO 2017044069 A1 3/2017

OTHER PUBLICATIONS

Shane McIntosh, The evolution of Java build systems, (2012), Empir Software Eng (2012, 17:578-608) p. 579-609. (Year: 2012).*
(Continued)

*Primary Examiner* — Lewis A Bullock, Jr.
*Assistant Examiner* — Mohammad H Kabir

(57) ABSTRACT

In non-limiting examples of the present disclosure, systems, methods and devices for detecting a code defect associated with a cloud-based service are presented. A correlation between an operation failure spike in an outermost development ring prior to a production environment for a current software build and an operation failure spike in a development ring that precedes the outermost development ring for the current software build may be identified. A determination may be made that an operation failure spike corresponding to the spike in the outermost development ring in a previous software build did not exist. A determination may be made that an operation failure spike corresponding to the development ring that precedes the outermost development ring for a previous software build did not exist. An operation associated with the failure spikes may be flagged as being related to the code defect based on the findings.

17 Claims, 9 Drawing Sheets

Start
Monitor operations 402
Identify spike in outermost dev ring 404
Identify spike in preceding dev ring 406
Determine spike does not exist in outermost dev ring for previous build 408
Determine spike does not exist in preceding dev ring for previous build 410
Determine no elevated level of errors in production environment 412
Flag operation 414
End
400

(56) References Cited

U.S. PATENT DOCUMENTS

| | | | | |
|---|---|---|---|---|
| 2015/0339207 | A1* | 11/2015 | Hod | G06F 11/3684 |
| 2016/0162395 | A1* | 6/2016 | dos Santos | G06F 11/3688 717/124 |
| 2017/0132057 | A1 | 5/2017 | Zhang et al. | |
| 2017/0177324 | A1 | 6/2017 | Frank et al. | |
| 2017/0220448 | A1 | 8/2017 | Topiwala et al. | |
| 2018/0121317 | A1* | 5/2018 | Ekambaram | G06F 11/366 |
| 2018/0136988 | A1 | 5/2018 | Nandagopal | |

OTHER PUBLICATIONS

Anderson, Jeffrey Ryan, "Understanding Contextual Factors in Regression Testing Techniques", In Dissertation of the North Dakota State University of Agriculture and Applied Science, Apr. 2016, 114 Pages.

Azzi, et al., "A Collaborative Filtering Recommender System for Test Case Prioritization in Web Applications", In Journal of Computing Research Repository, Jan. 2018, pp. 1-8.

"International Search Report and Written Opinion Issued in PCT Application No. PCT/US19/038829", dated Feb. 5, 2020, 23 Pages.

* cited by examiner 100
102
104
106
108
110
112
114
118
120
Previous
Deployment
Data
NETWORK
116
122
7

302
304
308
OUTER DEVELOPMENT RING
OPERATION ERRORS
TIME
ENGINEERING DEVELOPMENT RING
OPERATION ERRORS
TIME
310
306

DETECTION OF CODE DEFECTS VIA ANALYSIS OF TELEMETRY DATA ACROSS INTERNAL VALIDATION RINGS

BACKGROUND

As computing has increasingly moved toward the cloud, systems that support large numbers of users and the cloud-based applications that they utilize are constantly being modified. The infrastructure of cloud-based systems requires constant monitoring just to maintain, not to mention to update and add additional features and functionality. As new software builds are added to the infrastructure of cloud-based systems through development rings, and eventually production environments, it can be difficult to determine whether operational failures are related to code defects in the new software builds, or whether they simply represent noise that may be completely unrelated to code defects in those builds.

It is with respect to this general technical environment that aspects of the present technology disclosed herein have been contemplated. Furthermore, although a general environment has been discussed, it should be understood that the examples described herein should not be limited to the general environment identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter. Additional aspects, features, and/or advantages of examples will be set forth in part in the description which follows and, in part, will be apparent from the description or may be learned by practice of the disclosure.

Non-limiting examples of the present disclosure describe systems, methods and devices for identifying code defects for software builds based on telemetry data received from current and previous versions of the software builds. The telemetry data may be comprised of information describing operational failures for cloud-based applications associated with the software builds. An operational failure spike may be identified in an outermost development ring prior to a production environment ring, and a corresponding operational failure spike in the outermost development ring for a previous version of the software build may be verified as not having occurred therein. An operational failure spike may also be identified in a ring of the current software build that precedes the outermost development ring. The preceding ring in which this spike is identified may be an engineering ring or an internal testing ring. A corresponding operational failure spike may be identified in a previous version of the software build as not having occurred therein. Based on the above identifications/determinations, a code defect may be identified for the current software build. A code defect may be flagged by a system monitor and a notification may be sent to IT personnel for debugging. The notification may include a graphical representation of the operational failure spikes in the rings where they were detected and/or identified.

BRIEF DESCRIPTION OF THE DRAWINGS

Non-limiting and non-exhaustive examples are described with reference to the following figures.

DETAILED DESCRIPTION

Figure 1:
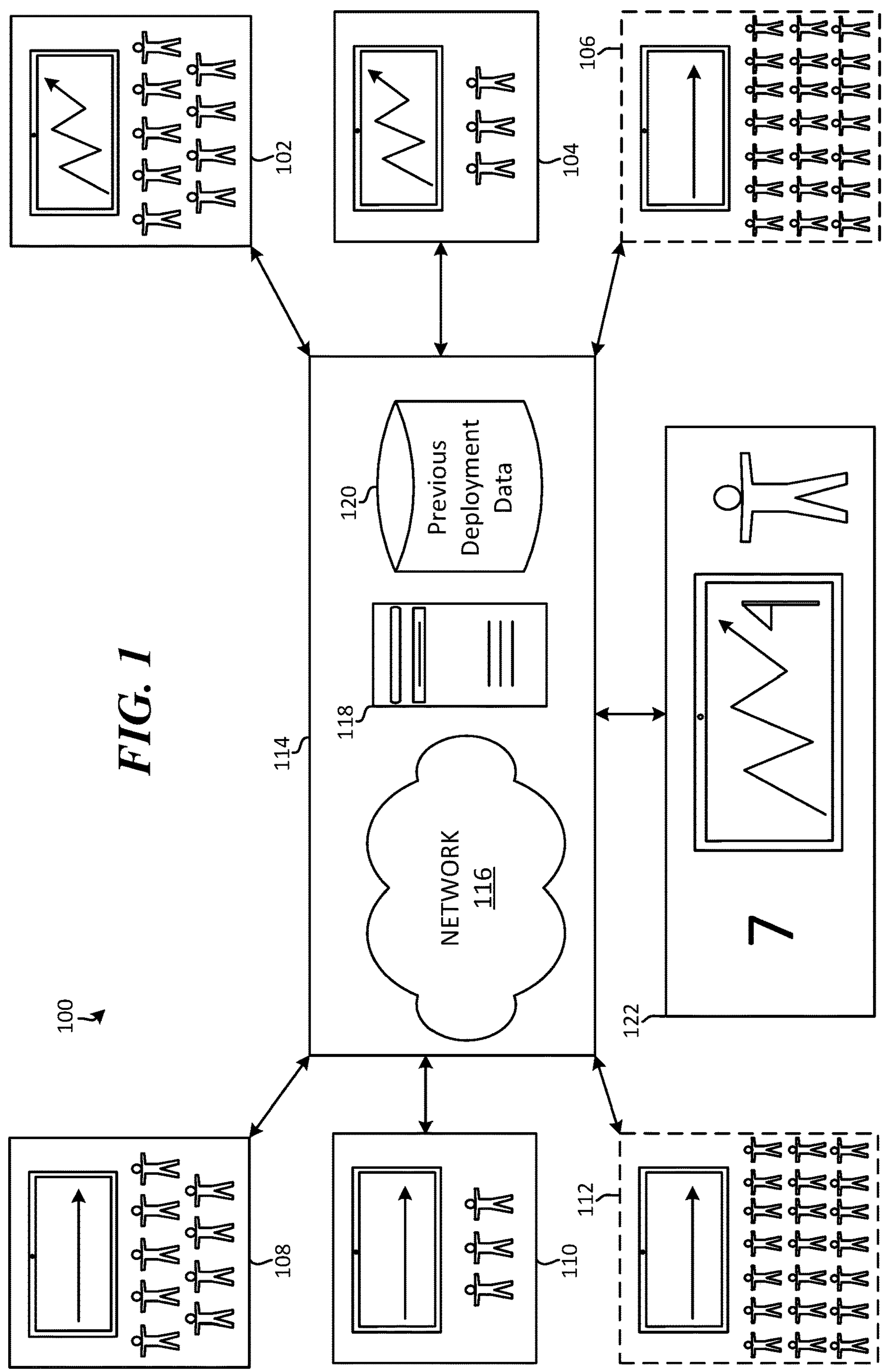
FIG. 1 is a schematic diagram illustrating an example distributed computing environment for detecting a code defect associated with a cloud-based application service.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The various embodiments and examples described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the claims.

Examples of the disclosure provide systems, methods, and devices for detecting code defects associated with cloud-based application services. The code defects may be included in new software packages, updates, and/or patches, for example. In some examples, the code defects may be associated with one or more cloud-based applications, such as cloud-based document processing applications, spreadsheet applications, calendar applications, presentation applications, storage applications, video applications, real-time electronic messaging applications, voice messaging applications, video communication applications, and/or email applications. In some examples, a system monitor may monitor signals associated with operation failures related to one or more cloud-based applications. For example, when an operation for a cloud-based application fails, and/or an operation for a cloud-based application causes an application crash or malfunction when it is performed, a signal indicating that there was an operation event, or operation failure, may be reported to the system monitor. The system monitor may monitor one or more operations associated with cloud-based applications. For example, the system monitor may monitor "save" operations, "send" operations, "new document" operations, "copy" operations, "paste" operations, and any other operation that may be performed by cloud-based applications.

According to examples, the system monitor may monitor operation failure signals from an outermost development ring for a software build (i.e., a development ring prior to a production environment). In some examples, when a threshold number of operation failure signals for an operation have been received and/or detected by the system monitor over a threshold duration of time, the system monitor may determine whether a similar spike in operation failures has occurred in a preceding development ring for the software build. That is, the system monitor may determine whether a threshold number of operation failure signals for the operation were also received, reported, and/or can otherwise be identified in a preceding development ring during a threshold duration of time for the software build. In some examples, the number of operation failures needed to identify an operation spike in the outermost development ring may be higher than the number of operation failures needed to identify an operation spike in a preceding development ring due to a higher number of operations being performed by a larger user base in the outer development rings. Additionally, in some examples, rather than simply utilizing a sheer number for identifying operation failure spikes, a ratio and/or percentage of failure operations to no failure operations for a given operation may be utilized in determining whether an operation failure spike has occurred.

If an operation failure spike for a specific operation in an outermost development ring of a software build has been identified, and a corresponding operation failure spike for that specific operation has also been identified in a preceding development ring for the software build, the system monitor may then identify whether operation spikes for that specific operation were also present in a previous version of the software build. That is, the system monitor may identify whether operation failure spikes corresponding to those that were identified in the new software build were also present in one or more rings and/or environments in a previous version of the software build. In some examples, the system monitor may analyze past operational failure data for one or more previous version of the software build to make this determination. According to some examples, if a corresponding operational failure spike in a previous version of the software build is identified by the system monitor as not having occurred in each of the corresponding development rings (e.g., an outermost development ring, and a preceding development ring), the system monitor may flag the operation failures and their corresponding spikes in the current software build as being related to a code defect (as opposed to being related to system noise).

In additional examples, further validation may be performed prior to flagging operational failures and/or their corresponding spikes as being related to a code defect. That is, in some examples, the system monitor may additionally determine whether elevated levels of operational errors for the specific operation occurred in a production environment for the current software build and/or a previous version of the software build. In such examples, if the system monitor determines that elevated levels of operational errors for the specific operation did not occur in the production environment for the previous version of the software build and/or that elevated levels of operational errors for the specific operation do exist in the production environment for the current software build, the system monitor may then flag the operation failures and their corresponding spikes in the current software build as being related to a code defect. In some examples, the elevated levels must meet a threshold number of operational failures over a threshold duration of time for the system monitor to flag the operational failures in the current software build as being related to a code defect. In other examples, the elevated levels must meet a threshold ratio and/or percentage of failed operations to successful operations for the system monitor to flag the operational failures in the current software build as being related to a code defect.

The systems, methods, and devices described herein provide technical advantages for detecting code defects associated with cloud-based application services. Memory costs associated with storing current build operation failures for later performing manual code diagnostic work are reduced due to the automation of operational failure spike analysis that may be performed in near real-time according to the description herein. For example, prior to the current solution, operational errors and reports would typically be stored for analysis by human engineers, which were not available for performing such analysis when the operational errors occurred. Processing costs associated with the release of new software builds are also reduced by utilizing the systems, methods and devices described herein. For example, prior to the current solution, when an engineer determined that operational failures may be related to a code defect in a current software build, the rate of error in those determinations was relatively high compared with what can be achieved according to the current description. Thus, when such a determination is made, it is common for at least a portion of the new software build code to be rolled back out of the new software build to determine whether the code is indeed defective and causing the operational errors, and/or what portions of the code are defective and causing the operational errors. The need to remove code and replace it is greatly reduced due to the lower rate of error achieved according to the systems, methods, and devices described herein, thereby significantly reducing processing, storage, and human costs associated with the same.

FIG. 1 is a schematic diagram illustrating an example distributed computing environment 100 for detecting a code defect associated with a cloud-based application service. Distributed computing environment 100 includes first development ring 102, which is an outermost development ring, prior to a production environment, for a current software build; second development ring 104, which is a development ring that precedes first development ring 102 (e.g., second development ring 104 may comprise a first level of testing with an engineering group of users for the software build, and first development ring 102 may comprise a second level of testing with a larger internal group of testing users for the software build); and production environment 106, which is a ring corresponding to the release of the current software build to users outside of the organization that developed the current software build. Distributed computing environment 100 also includes development ring 108, which is an outermost development ring, prior to production environment, for a previous version of the current software build; development ring 110, which is a development ring that precedes development ring 108 in the previous version of the software build; and production environment 112, which is a ring that corresponds to release of the previous software build to users outside of the organization that developed the previous software build. That is, development ring 108 corresponds to a previous software build version of first development ring 102, development ring 110 corresponds to a previous software build version of second development ring 104, and production environment 112 corresponds to a previous software build version of production environment 106.

Distributed computing environment 100 also includes network and processing sub-environment 114, which comprises network 116, via which any of the computing devices in distributed computing environment 100 may communicate with one another; server computing device 118; and previous deployment data storage 120. A monitoring service that monitors operational data from one or more cloud-based applications may reside on one or more computing devices in network and processing sub-environment 114. For example, one or more cloud-based applications may report operational errors to the monitoring service. The operational errors may be associated with software builds for cloud-based applications deployed to one or more rings and deployment environments. In other examples, the monitoring service may detect operational errors associated with software builds for cloud-based applications deployed to one or more rings and deployment environments. The monitoring service may determine whether drops in quality of service associated with one or more cloud-based applications correspond to code defects associated with one or more operations in new software builds for one or more application operations, or whether the drops in quality of service are related to noise in the system.

The system monitor may detect and/or receive information associated with operation errors for a current software build from users and their devices executing application software for the current software build in first development ring 102. In some examples, the operational errors may be automatically reported to the system monitor by the cloud-based applications when they occur. In other examples, an opt-in system may exist such that, at least in the production environments, users must op-in to allow the operational errors to be automatically reported to the system monitor. In still other examples, the system monitor may detect operational errors in addition to, or alternative from, receiving operational error notifications.

The system monitor also detects and/or receives notifications associated with operational errors for the current software build from users and their devices executing application software for the current software build in second development ring 104. In some examples, the current software build in second development ring 104 may be executed concurrently with the current software build in the first development ring 104 (i.e., the current software build may be deployed in both rings/environments at the same time). In other examples, the current software build in the second development ring 104 may be executed after the current software build has been tested in the first development ring 104.

The system monitor may analyze data from the operational errors detected and/or received from first development ring 102, and determine whether operational spikes associated with first development ring 102 occur and/or meet a threshold value. In some examples, the threshold value may comprise a number of operational failures for a specific operation over a specified duration of time. In other examples, the threshold value may comprise a percentage of users in first development ring 102 that have had a specific operational failure over a specified duration of time. In still other examples, the threshold value may comprise a percentage of a number of operational failures for a particular operation compared with a number of operational successes for the particular operation.

Regardless, upon determining that an operational spike associated with first development ring 102 has occurred, the system monitor may analyze data from operational errors detected and/or received from second development ring 104, and determine based on that analysis whether an operational spike associated with second development ring 104 for the same specific operation occurred at a time corresponding to the time that the spike occurred in first development ring 102. That is, the system monitor may analyze operational failure information from second development ring 104 for the approximate time window in which the operational failure occurred for first development ring 102, and determine whether: a same or similar percentage of operational errors were reported over a same or similar duration of time during that time window as for first development ring 102; a same or similar number of operational errors were reported over a same or similar duration of time during that time window as for first development ring 102; and/or a smaller number of operational errors were reported, corresponding to the smaller number of testing users in second development ring 104 compared with the larger number of testing users in first development ring 102, over a same or similar duration of time during that time window as for first development ring 102. In some examples, the system monitor may look for operational failure spikes in first development ring 102 that lag in time behind the time window in which operational failure spikes in second development ring 104 occurred. That is, based on a number of users in each of first development ring 102 second development ring 104, and/or a delayed release between second development ring 104 and first development ring 102, a certain lag time between spikes for operations may be accounted for by the system monitor.

According to some examples, prior to reporting operational spikes for a specific operation over a duration of time as corresponding to a code error for a current software build, the system monitor may verify that operational failure spikes, corresponding to the operation failure spikes for the specific operation that were detected in each of first development ring 102 and second development ring 104 for the current software build, were not present in corresponding rings for the previous software build (e.g., development ring 108 in the previous software build corresponding to first development ring 102 in the current software build; and development ring 110 in the previous software build corresponding to second development ring 104 in the current software build). That is, the system monitor may analyze operational error data from development ring 110 in the previous software build, to verify that a failure spike corresponding to the failure spike detected in second development ring 104 in the current software build did not occur; and the system monitor may analyze operational error data from development ring 108 in the previous software build, to verify that a failure spike corresponding to the failure spike detected in first development ring 102 in the current software build did not occur. In some examples, the operational data for previous software builds may be stored in previous deployment data storage 120 for later analysis by the system monitor. For example, operational data, including operational failure data, for each of development ring 108, development ring 110, and/or production environment 112 may be stored in previous deployment data storage 120. In additional examples, operational data for the current software build may also be stored in previous deployment data storage 120, or in a current software deployment data storage. In other examples, operational data from the current software build and/or the previous software build may be analyze in real-time or near real-time.

According to some examples, if the system monitor determines that an operational spike for a specific operation occurred in a time window in first development ring 102, and a corresponding spike for the specific operation occurred in the same time window for second development ring 104, or that two operational spikes are related based on lag time as described above, the system monitor may determine that a code error in the current software build has occurred that is associated with the specific operation. In some examples, the system monitor must first verify that operational spikes corresponding to the spikes identified/determined in first development ring 102 and second development ring 104 did not occur in in corresponding production rings in the previous software build (i.e., development ring 108 and development ring 110) prior to determining that a code error in the current software build has occurred that is associated with a specific operation. Once that determination has been made, the system monitor may flag the error and notify a user in failed operation flagging environment 122 for diagnosis and/or fixing. That user may be an IT support user associated with the cloud-based application service. The flagging of the error may comprise sending a report of the operational failure spikes from first development ring 102 and second development ring 104 to the user in failed operation flagging environment 122. In some examples, the report may comprise a graphical representation of a number and/or a percentage of operational failures for the specific operation over a duration of time for each of first development ring 102 and second development ring 104. Examples of the report are illustrated and described in relation to FIG. 3 herein.

According to some examples, in determining that a code error in the current software build has occurred that is associated with a specific operation, the system monitor may confirm the code error by performing the additional steps of determining that an operational spike for the specific operation occurred for the current software build in production software environment 106, and/or that a corresponding operational spike for the specific operation did not occur for a previous version of the software build in production environment 112. That is, in some examples, in addition to determining that failure spikes for a specific operation occurred in first development ring 102 and second development ring 104, and that corresponding failure spikes for the specific operation did not occur in corresponding development rings (e.g., development ring 108 and development ring 110) for a previous version of the software build, the system monitor may additionally verify that a corresponding operational spike did not occur in production environment 112 for a previous version of the software build, and/or that a corresponding operational spike did occur in in production environment 106 for the current version of the software build. In examples where the system monitor verifies that a corresponding operational spike did occur in production environment 106 in the current software build, a graphical representation of that failure spike may be provided to the IT user as part of the report sent in failed operation flagging environment 122.

Figure 2:
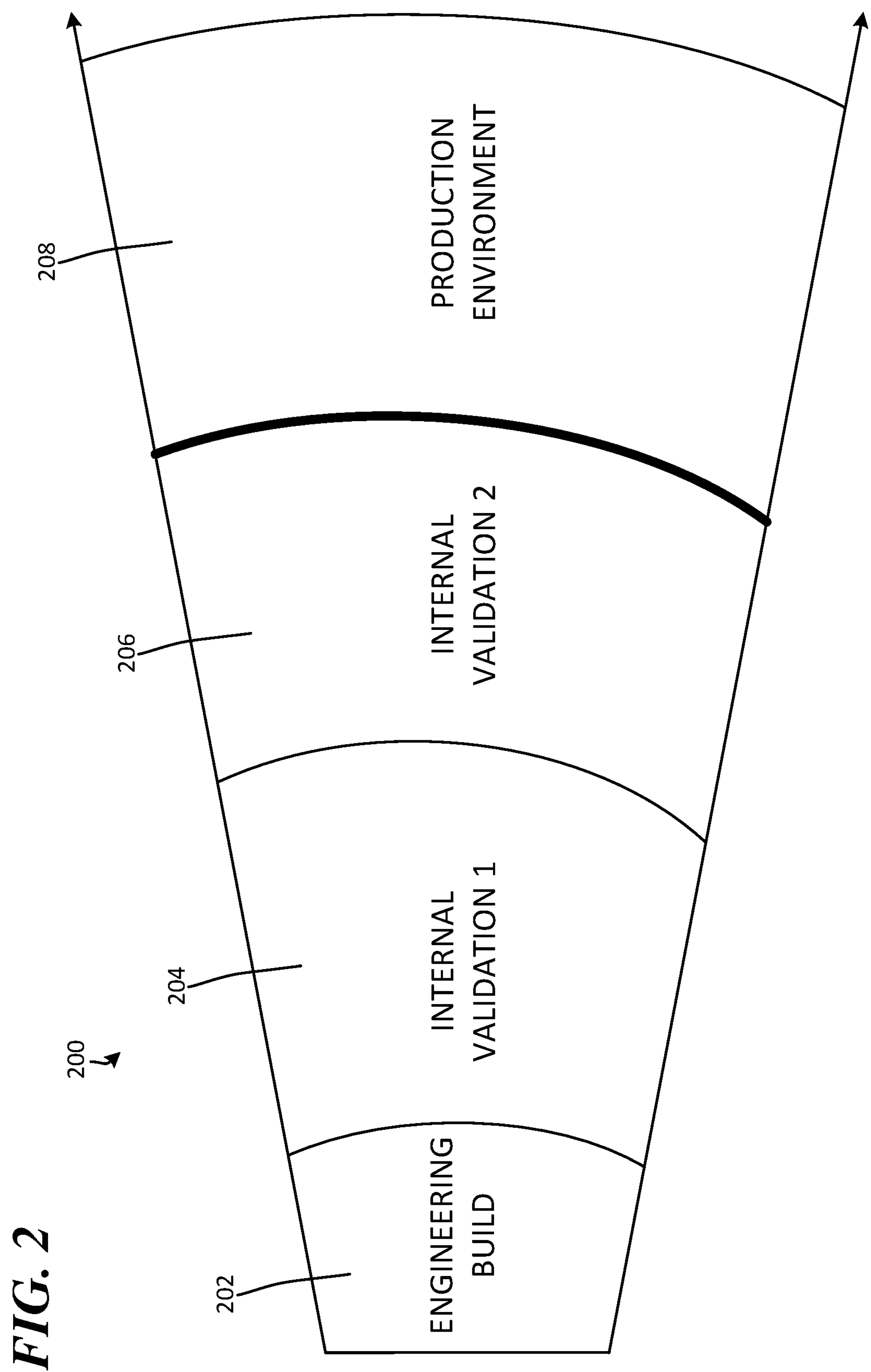
FIG. 2 illustrates rings that may be monitored as part of a software build being implemented in a cloud-based application service.

FIG. 2 illustrates software development rings 200 that may be monitored as part of a software build being implemented in a cloud-based application service. The software development rings 200 include engineering build ring 202, internal validation ring one 204, internal validation ring two 206, and production environment ring 208. In general, software development rings will include at least one engineering ring, such as engineering build 202, where a software build is released to a relatively small number of software engineers in the organization that created the software build; at least one internal validation ring, such as internal validation ring one 204 and internal validation ring two 206, where a software build is released to a relatively larger number of users in the organization; and at least one production environment ring, such as production environment ring 208, where a software build is released for consumption by users outside of the organization that developed the software build. Although there are three rings in the example of FIG. 2 prior to production environment ring 208 (i.e., engineering build ring 202, internal validation ring one 204, internal validation ring two 206), it should be understood that more or fewer rings prior to the production environment ring may be present. For example, if internal validation ring one 204 was not present, the current invention could nonetheless be implemented utilizing internal validation ring two 206 (because it is the last ring prior to the production environment) in association with engineering build ring 202.

Engineering build ring 202 comprises a first ring of testing for a software build. For example, when a software build is first created it may be sent to a small group of users in the software engineering group that developed the software build. This group of users may comprise engineering build ring 202. With reference to FIG. 1, engineering build ring 202 may correspond to second development ring 104 in the current software build and/or development ring 110 in the previous software build.

Internal validation ring one 204 comprises a second ring of testing for the software build. For example, when a software build has been validated amongst a first group of users (e.g., the users in engineering build ring 202), the software build may be released to a relatively larger group of users that are part of the organization that developed the software build. This group of users may comprise internal validation ring one 204. Internal validation ring one 204 does not have a corresponding ring in FIG. 1, because there are not two internal testing rings in FIG. 1. Rather, FIG. 1 illustrates a single internal ring of testing (e.g., first development ring 102 in the current version of the software build and corresponding development ring 108 in the previous version of the software build), and that ring is the outermost development ring prior to a production environment ring.

Internal validation ring two 206 comprises a third ring of testing for the software build. For example, when a software build has been validated amongst a first group of users (e.g., the users in engineering build ring 202) and a second group of users (e.g., the users in internal validation ring one 204), the software build may be released to a still larger group of users that are part of the organization that developed the software build. This group of users may comprise internal validation ring 206. With reference to FIG. 1, internal validation ring two 206 may correspond to first development ring 102 in the current software build and/or development ring 108 in a previous version of the software build.

Production environment ring 208 comprises a release of the current software build to users outside of the organization that developed it. For example, when a software build has been validated amongst users in one or more internal and/or engineering rings, the software build may be released for consumption by users outside of the organization as part of a standard product release, or part of test group of consumers. This group of users may comprise production environment ring 208.

Figure 3:
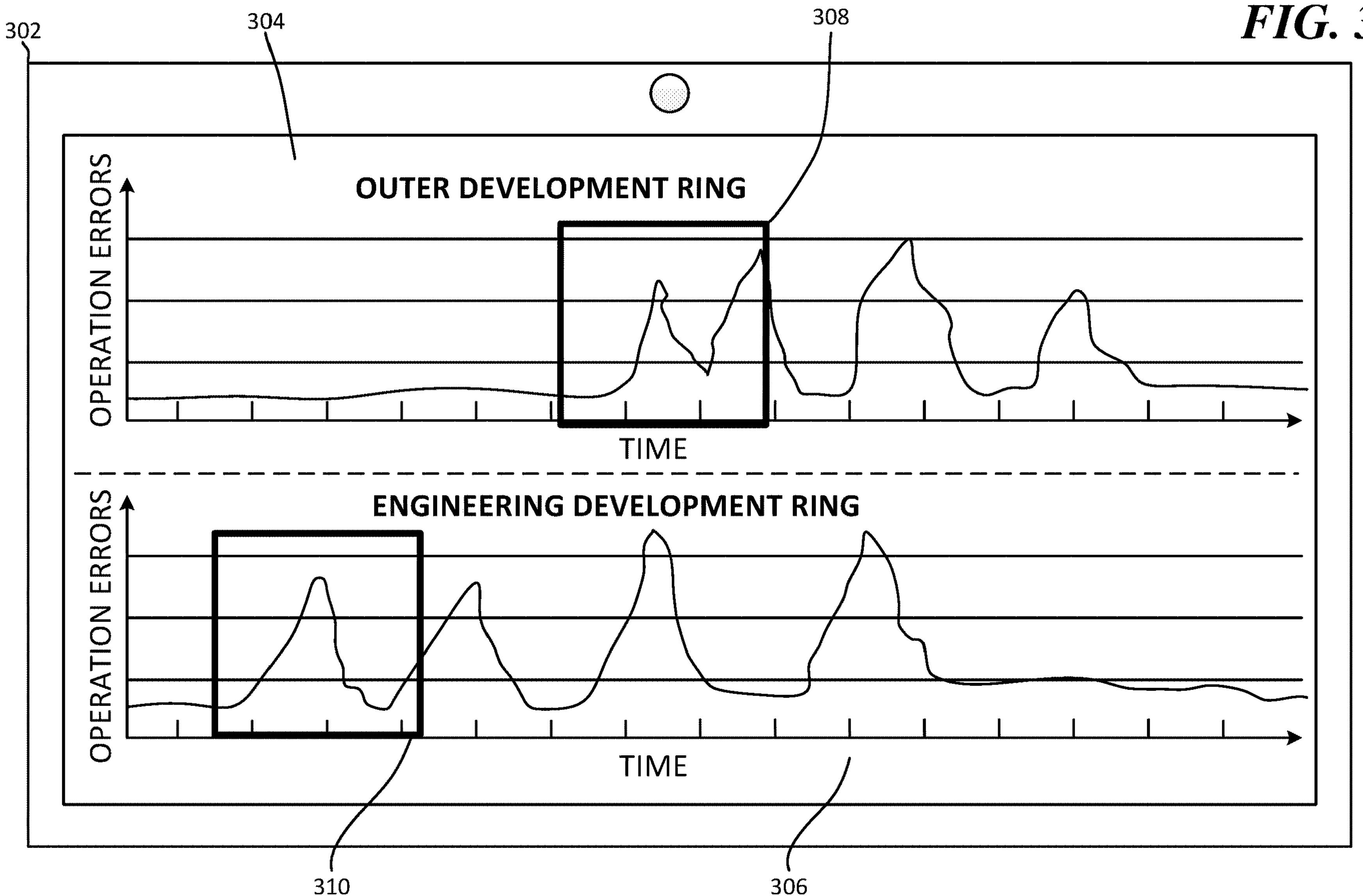
FIG. 3 illustrates an exemplary user interface for indicating that operation failure spikes in an outer development ring and an engineering development ring are related to one another, as well as being indicative of a code defect.

FIG. 3 illustrates an exemplary user interface on computing device 302 for indicating that operation failure spikes in an outer development ring and an engineering development ring are related to one another, as well as being indicative of a code defect. Although graphs are illustrated for operation failure spikes in an outer development ring and an engineering development ring, it should be understood that a graph displaying operation failure spikes over time for a production environment may similarly be caused to be displayed on computing device 302.

The user interface on computing device 302 includes a graphical representation 304 of operational errors for a specific operation in an outer development ring for a current software build, and a graphical representation 306 of operational errors for the specific operation in an engineering development ring for the current software build. The Y axis of each of graphical representation 304 and graphical representation 306 represents a number of operational errors received/determined by the system monitor for the specific operation, and the X axis of each of graphical representation 304 and graphical representation 306 represents time. The time and scale represented by the X axis of graphical representation 304 and graphical representation 306 are the same.

In some examples, the scale of the Y axis may be the same for the outer development ring and the engineering development ring. This may be the case where the number of users in the outer development ring and the engineering development ring are the same or similar. In other examples, the scale of the Y axis may be different for the outer development ring and the engineering development ring. This may be the case where the number of users in the outer development ring and the engineering development ring are different. For example, in most cases, the number of users in the engineering development ring will be smaller than the number of users in the outer development ring. Thus, the scale for the outer development ring may be larger (e.g., each horizontal line in graphical representation 304 may represent one-thousand users, each horizontal line in graphical representation 304 may represent ten-thousand users) than the scale for the engineering development ring (e.g., each horizontal line in graphical representation 306 may represent ten users, each horizontal line in graphical representation 306 may represent one-hundred users). Thus, for the system monitor to detect operational failure spikes that correspond between an outer development ring and an engineering development ring, there may be significantly fewer operational failures for a duration of time in the engineering ring than in the outer development ring.

In additional examples, the Y axis for the outer development ring graph (graphical representation 304) and the engineering development ring graph (graphical representation 306) may represent a percentage of users in each respective ring that experienced errors for the specific operation at any given time compared with users that did not experience errors for the specific operation at any given time. In other examples, the Y axis for the outer development ring graph and the engineering development ring graph may represent a percentage comprised of a number of failed operations for a given operation compared with a number of successfully performed operations for the given operation. In such an examples, the scale for the Y axis in each of graphical representation 304 and graphical representation 306 may be the same (e.g., 25%, 50%, 75% for the horizontal lines in each of the outer development ring graph and the engineering development ring graph).

In this example, a spike in operational errors for a specific operation is shown to have occurred in the engineering development ring at section 310 of graphical representation 306. A corresponding spike in operational errors for the specific operation is shown to have occurred in the outer development ring at section 308 of graphical representation 304. In this example, the operational failure spike in the outer development ring occurred later than the operational failure spike in the engineering development ring (i.e., there is a lag between spikes). In some examples, the lag may be due to the software build first being released to users in the engineering development ring, and subsequently to the outer development ring. In other examples, the lag may be due to the software build being initially released to a low number of users in the outer development ring compared with the engineering development ring, and subsequently releasing the software build to additional users in the outer development ring over time.

Figure 4:
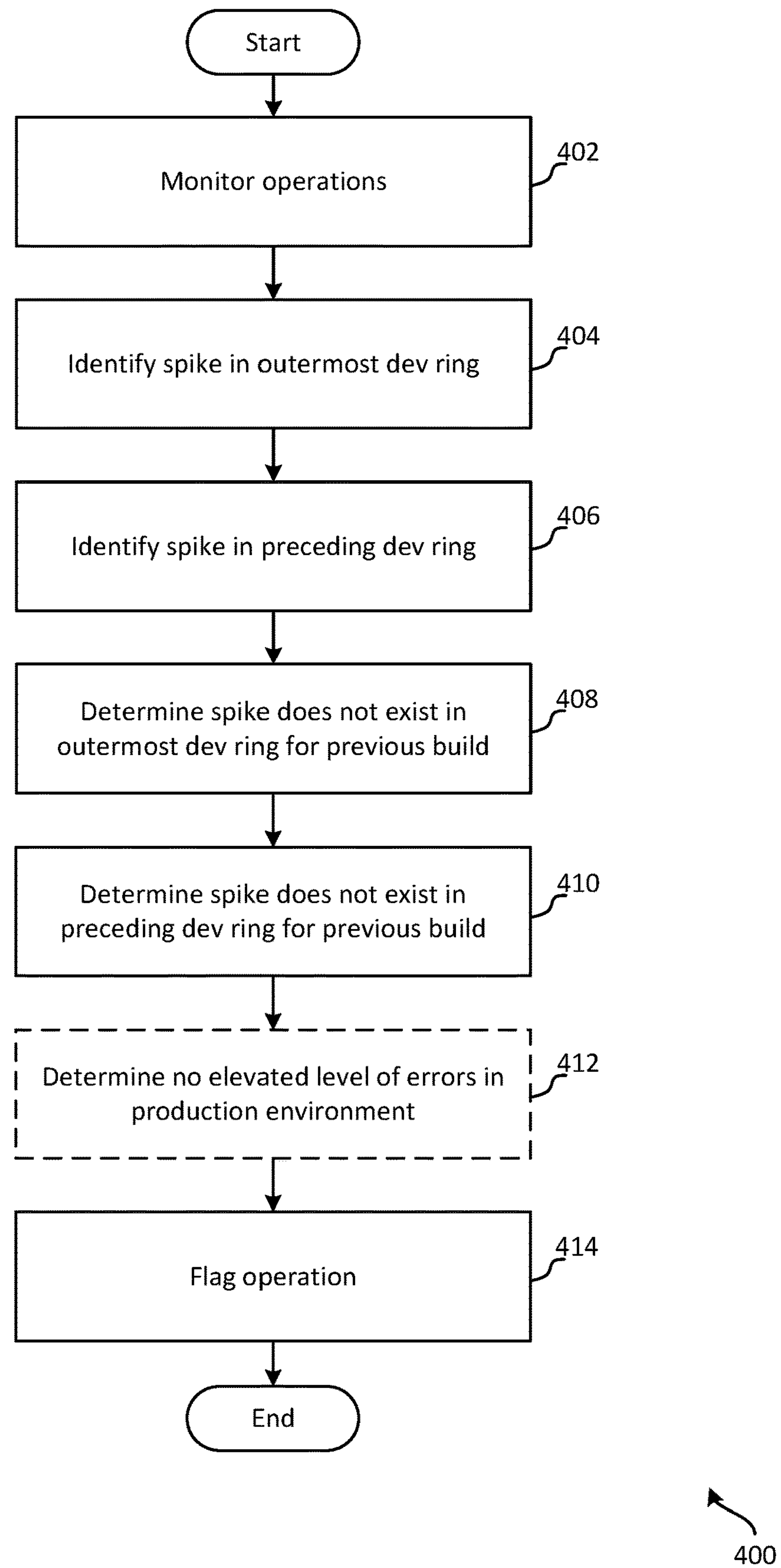
FIG. 4 is an exemplary method for detecting a code defect associated with a cloud-based application service.

FIG. 4 is an exemplary method 400 for detecting a code defect associated with a cloud-based application service. The method begins at a start operation and flow continues to operation 402.

At operation 402 a plurality of operations associated with a cloud-based application service are monitored by a system monitor. The cloud-based application service may host one or more applications, including productivity applications such as word processing applications, spreadsheet applications, email applications, presentation applications, video applications, call applications, instant messaging applications, and the like. New versions, patches, and other updates associated with those applications and/or the cloud-based service may be rolled out as new software builds that are tested in a plurality of development rings prior to being released to users outside of the developing organization in production environments for those software builds. According to some examples, the monitoring service may receive notifications when operations associated with a cloud-based application fail and/or cause a failure of one or more elements of the application. In other examples, the monitoring service itself may detect when operations associated with a cloud-based application fail and/or cause a failure of one or more elements of the application. Examples of operations that may be monitored by the system monitor include, but are not limited to, save operations, new document operations, copy operations, paste operations, and the like.

From operation 402 flow continues to operation 404 where a failure spike for a specific one of the plurality of operations is identified in a first development ring, that is an outermost development ring prior to a production environment, for a software build associated with the cloud-based application service. In some examples, a failure spike comprises a threshold number of failed operations of any given type over a threshold duration of time (e.g., one-hundred save operations failures occurring over twenty minutes, fifty create new document operation failures occurring over thirty minutes). In other examples, the failure spike comprises a threshold percentage of users that have experienced failed operations for any given operation type over a threshold duration of time (e.g., 10% of users that have attempted a save operation have experienced a failure over a twenty-minute duration, 5% of all users have experienced a save operation failure over a thirty-minute duration). In some examples, the outermost development ring is one of a plurality of internal development rings used for testing new software builds prior to releasing the software to users outside of an organization. There may be one or more levels of internal testing that precede this last development ring prior to the production environment. Generally, these internal testing rings include at least one ring of engineering users, which is a smaller number of users than at least one ring of subsequent users that work for the organization that developed the new software build. However, the current invention may be applied in testing environments that have only engineering rings in the internal rings and/or where only organizational users outside of the engineering departments test the new software builds.

From operation 404 flow continues to operation 406 where a failure spike for the specific one of the plurality of operations is identified in a second development ring, that precedes the first development ring, for the software build. Like the failure spike identified at operation 404, the failure spike identified at operation 406 may comprise a threshold number of operation failures over a threshold duration of time and/or a threshold percentage of users that experience an operation failure over a threshold duration of time. In some examples, the failure spike identified at operation 406 may overlap, at least in part, in time with the failure spike identified at operation 404. In some examples, the failure spike identified at operation 406 may begin prior to the spike identified at operation 404. For example, where the second development ring comprises a group of engineering users, those users may begin testing the new software build prior in time to the next rings of development testing, and thus, a failure spike in the engineering ring would likely occur prior to spikes in rings outside of the engineering level.

From operation 406 flow continues to operation 408 where a determination is made, for a previous version of the software build, that a failure spike for the specific one of the plurality of operations did not occur in a development ring corresponding to the first development ring. In some examples, the system monitor may analyze stored operational data for a previous version of the software build for a ring corresponding to the first development ring in the previous software build. In other examples, the previous version of the software build may be concurrently executed by users with the current version of the software build, and the system monitor may analyze real-time, or near real-time, data for the previous version of the software build and/or the current version of the software build. The system monitor may determine for that ring (i.e., the ring in the previous version of the software build that corresponds to the first, outermost, development ring prior to production environment in the current software build) and the specific operation being looked at, that a spike (e.g., a threshold number of operational failures for the operation over a threshold duration of time, a threshold percentage of users that experienced an operational failure for the operation over a threshold duration of time, a threshold percentage of failed operations for the operation compared with successful operations for the operation over a threshold duration of time) corresponding to the failure spike identified at operation 404 did not occur in a previous version of the software build.

From operation 408 flow continues to operation 410 where a determination is made, for the previous version of the software build, that the failure spike for the specific one of the plurality of operations did not occur in a development ring corresponding to the second development ring. In some examples, the system monitor may analyze stored operational data for a previous version of the software build for a ring corresponding to the first development ring in the previous software build. In other examples, the previous version of the software build may be concurrently executed by users with the current version of the software build, and the system monitor may analyze real-time, or near real-time, data for the previous version of the software build and/or the current version of the software build. The system monitor may determine for that ring (i.e., the ring in the previous version of the software build that corresponds to the second development ring in the current software build—a ring that precedes the outermost development ring prior to production environment) and the specific operation being looked at, that a spike (e.g., a threshold number of operational failures for the operation over a threshold duration of time, a threshold percentage of users that experienced an operational failure for the operation over a threshold duration of time, a threshold percentage of failed operations for the operation compared with successful operations for the operation over a threshold duration of time) corresponding to the failure spike identified at operation 406 did not occur in a previous version of the software build.

In some examples, the threshold number of operational errors that must occur over a threshold duration of time may not be the same number of errors to constitute an operational failure spike in the first ring and the second ring. For example, the closer a development ring is to the center (first level testing), the lower the number and/or percentage may be due to a smaller number of users in those internal rings (e.g., engineering rings generally have smaller numbers of testing users than rings that comprise testing to a broader group of users in an organization).

From operation 410 flow continues to operation 412 where the specific one of the operations is flagged as being related to the code defect. In some examples, prior to flagging the operation as being related to the code defect, the system monitor may verify that there were no operational failure spikes for the specific operation in a production environment ring for a previous version of the software build. In other examples, prior to flagging the operation as being related to the code defect the system monitor may identify that there is an operational failure spike for the specific operation in a production environment ring for the current version of the software build. The flagging of the specific operation may comprise sending a notification to one or more IT users associated with the current software build. The notification may include or provide access to one or more graphical representations of the operational failure spikes that were identified/detected in the current and/or previous software builds. In additional examples, the system monitor may generate a real-time graph comprised of operation failures for one or more operations over time, and a snapshot of the operation failures corresponding to the code defect and the identified spikes may be provided as part of the flagging process.

From operation 412 flow continues to an end operation, and the method 400 ends.

Figure 5:
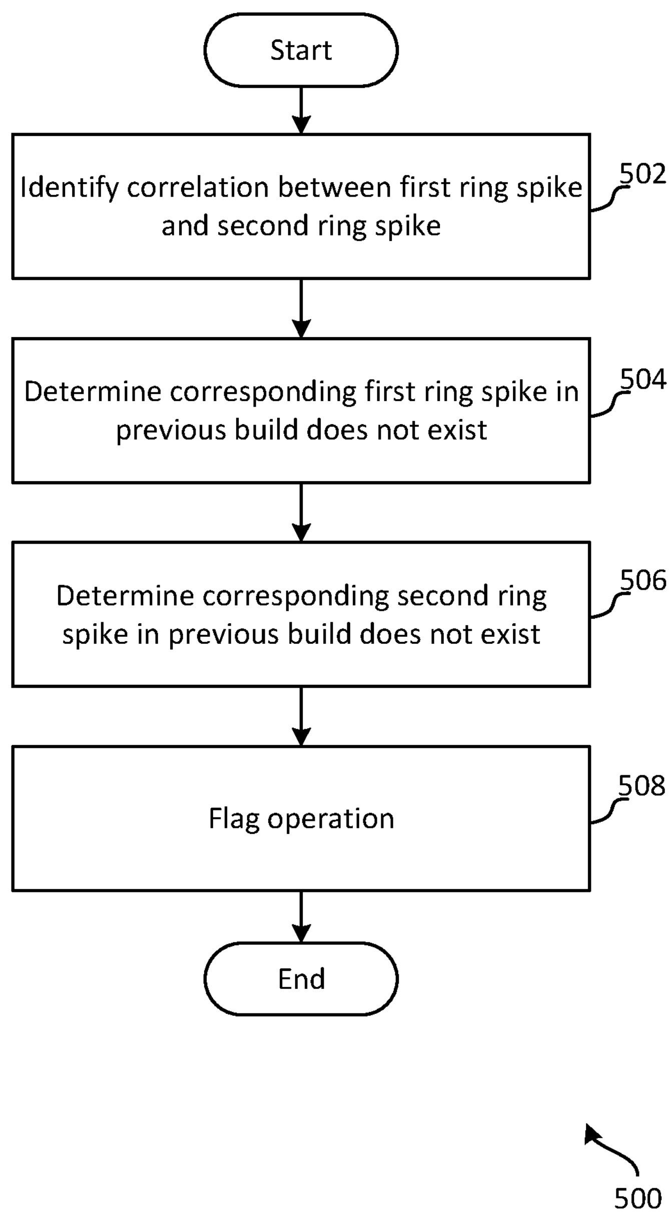
FIG. 5 is another exemplary method for detecting a code defect associated with a cloud-based application service.

FIG. 5 is another exemplary method 500 for detecting a code defect associated with a cloud-based application service. The method 500 begins at a start operation and flow continues to operation 502.

At operation 502 a correlation between an operation failure spike in a first development ring for a software build and an operation failure spike in a second development ring for the software build is identified. The first development ring for the software build is an outermost development ring prior to a production environment ring. In some examples, the operation failure spike may comprise a threshold number of operation failures for a given operation over a threshold duration of time. In other examples, the operation failure spike may comprise a threshold percentage of users that experience an operation failure for the operation over a threshold duration of time. In still other examples, the operation failure spike may comprise a threshold percentage of operation failures for a specific operation compared with successful operations for the specific operation over a threshold duration of time.

From operation 502 flow continues to operation 504 where a determination is made that an operation failure spike corresponding to the first failure spike did not exist for a previous version of the software build. The determination may be based on analysis, by the system monitor, of data stored for the previous version of the software build, or analysis of real-time, or near real-time data for the previous version of the software build.

From operation 504 flow continues to operation 506 where a determination is made that an operation failure spike corresponding to the second failure spike did not exist for a previous version of the software build. Like the determination made at operation 504, the determination that the operation failure spike corresponding to the second failure spike did not exist for a previous version of the software build may be made by the software monitor based on stored data, and/or based on real-time, or near real-time data for the previous version for the software build.

In examples where a threshold number of operation errors over a threshold duration of time is indicative of an operational failure spike, the threshold number of operation errors may be higher in the outermost development ring prior to a production environment ring than rings that precede the outer most development ring prior to the production environment ring because the outermost development ring prior to the production environment ring may have a larger group of testing users.

From operation 506 flow continues to operation 508 where an operation associated with the failure spikes is flagged as being related to a code defect in the current software build. The flagging may include sending one or more users an email or other electronic message that indicates that a code defect associated with the current software build and/or an operation of the current software build has been detected by the system monitor. In examples, a graph of a timeline associated with operational failure spikes in one or more development and/or production rings may be included with an identity of the flagged operation.

From operation 508 flow continues to an end operation and the method 500 ends.

Figure 6:
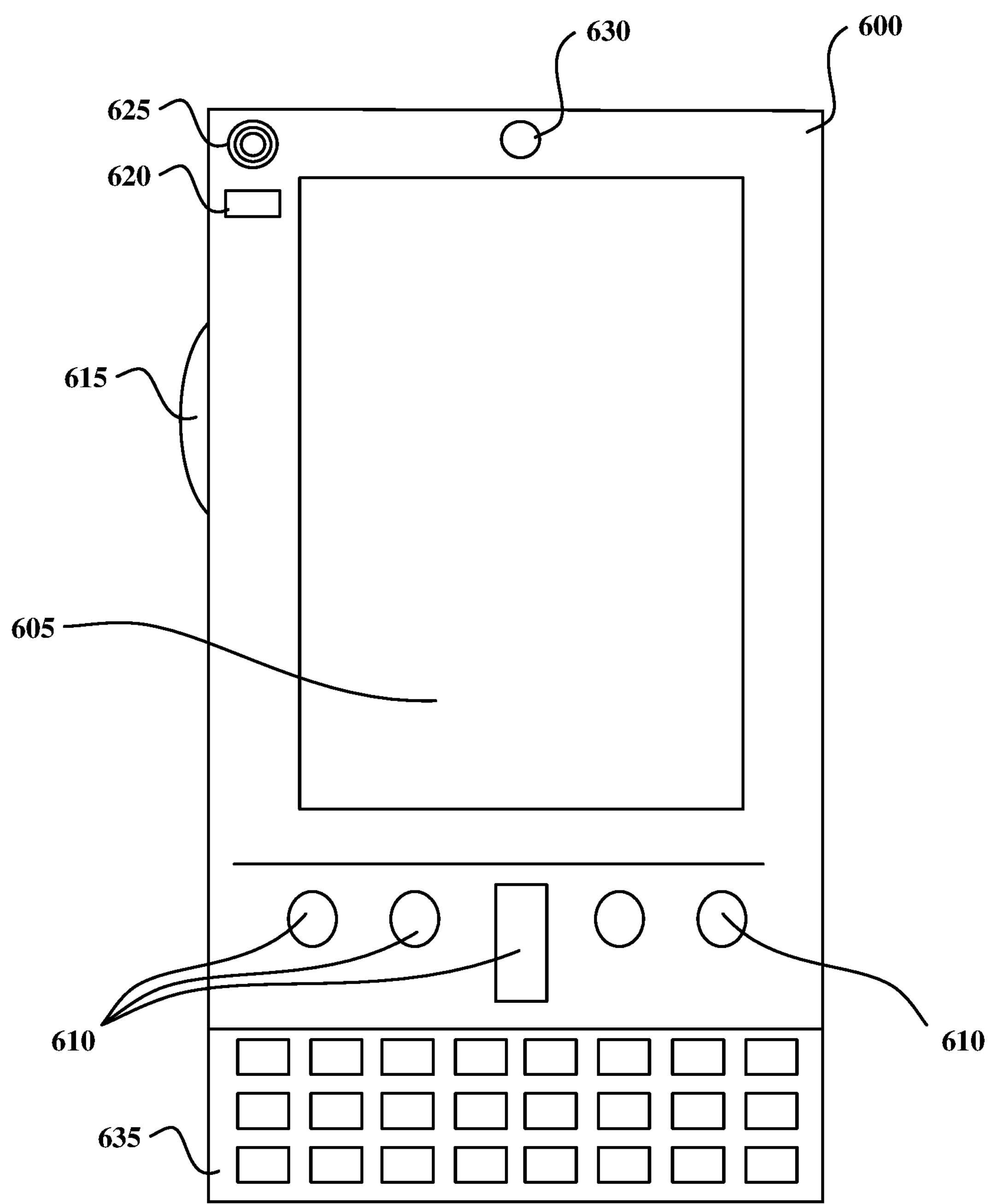
FIGS. 6 and 7 are simplified diagrams of a mobile computing device with which aspects of the disclosure may be practiced.
Figure 7:
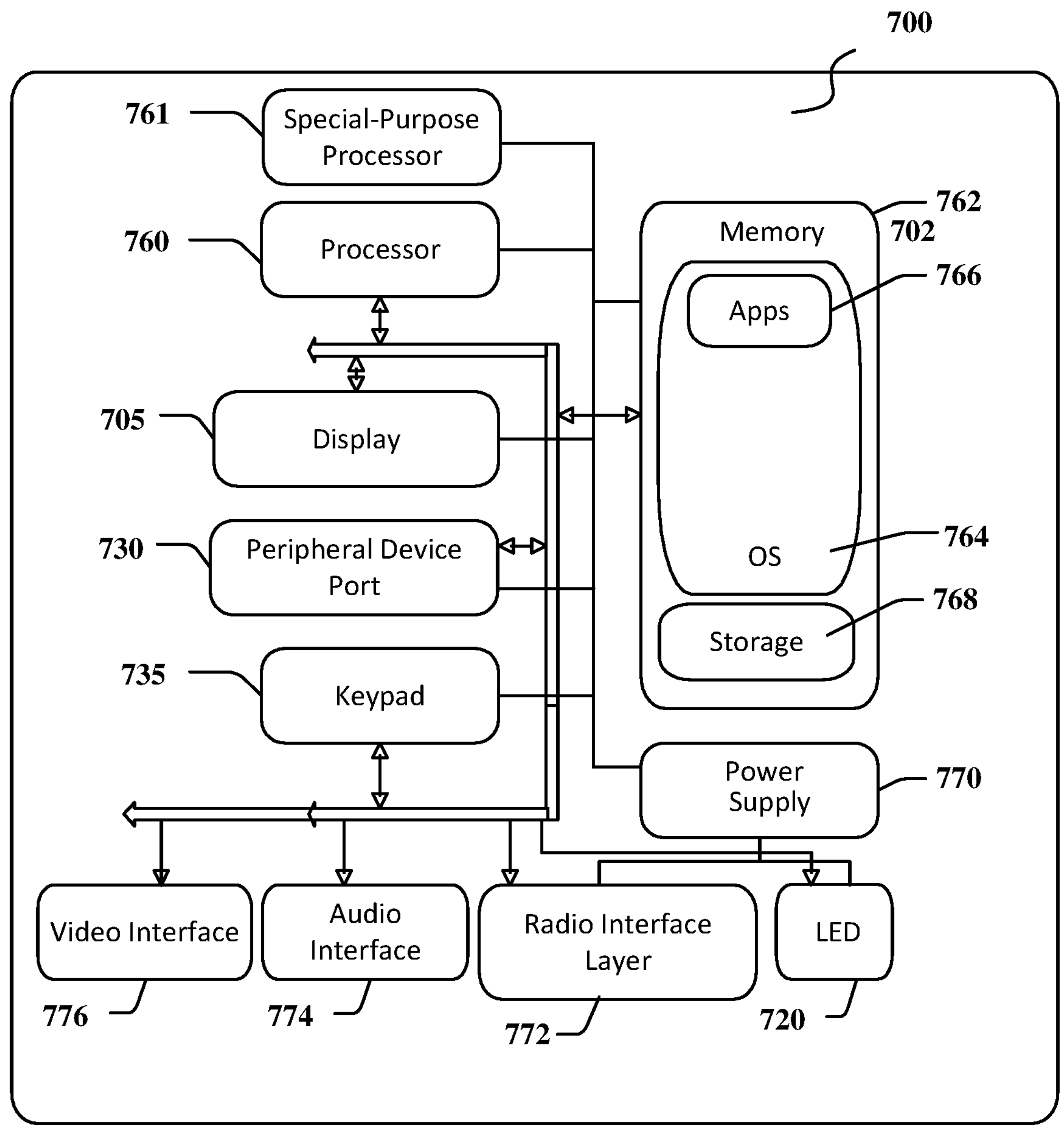

FIGS. 6 and 7 illustrate a mobile computing device 600, for example, a mobile telephone, a smart phone, wearable computer, a tablet computer, an e-reader, a laptop computer, AR compatible computing device, or a VR computing device, with which embodiments of the disclosure may be practiced. With reference to FIG. 6, one aspect of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative aspects, mobile computing device 600 may incorporate more or fewer input elements. For example, the display 605 may not be a touch screen in some embodiments. In yet another alternative embodiment, the mobile computing device 600 is a portable phone system, such as a cellular phone. The mobile computing device 600 may also include an optional keypad 635. Optional keypad 635 may be a physical keypad or a "soft" keypad generated on the touch screen display. In various embodiments, the output elements include the display 605 for showing a graphical user interface (GUI), a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 7 is a block diagram illustrating the architecture of one aspect of a mobile computing device. That is, the mobile computing device 700 can incorporate a system (e.g., an architecture) 702 to implement some aspects. In one embodiment, the system 702 is implemented as a "smart phone" capable of running one or more applications (e.g., browser, e-mail, calendaring, contact managers, messaging clients, games, and media clients/players). In some aspects, the system 702 is integrated as a computing device, such as an integrated personal digital assistant (PDA) and wireless phone.

One or more application programs 766 may be loaded into the memory 762 and run on or in association with the operating system 864. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700, including instructions for providing and operating a digital assistant computing platform.

The system 702 has a power supply 770, which may be implemented as one or more batteries. The power supply 770 might further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world," via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 620 may be used to provide visual notifications, and/or an audio interface 774 may be used for producing audible notifications via the audio transducer 625. In the illustrated embodiment, the visual indicator 620 is a light emitting diode (LED) and the audio transducer 625 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 625, the audio interface 774 may also be coupled to a microphone to receive audible input, such as to facilitate a telephone conversation. In accordance with embodiments of the present disclosure, the microphone may also serve as an audio sensor to facilitate control of notifications, as will be described below. The system 702 may further include a video interface 776 that enables an operation of an on-board camera 630 to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7 by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio interface layer 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 772 or via a distributed computing network. Similarly, such data/information may be readily transferred between computing devices for storage and use according to well-known data/information transfer and storage means, including electronic mail and collaborative data/information sharing systems.

Figure 8:
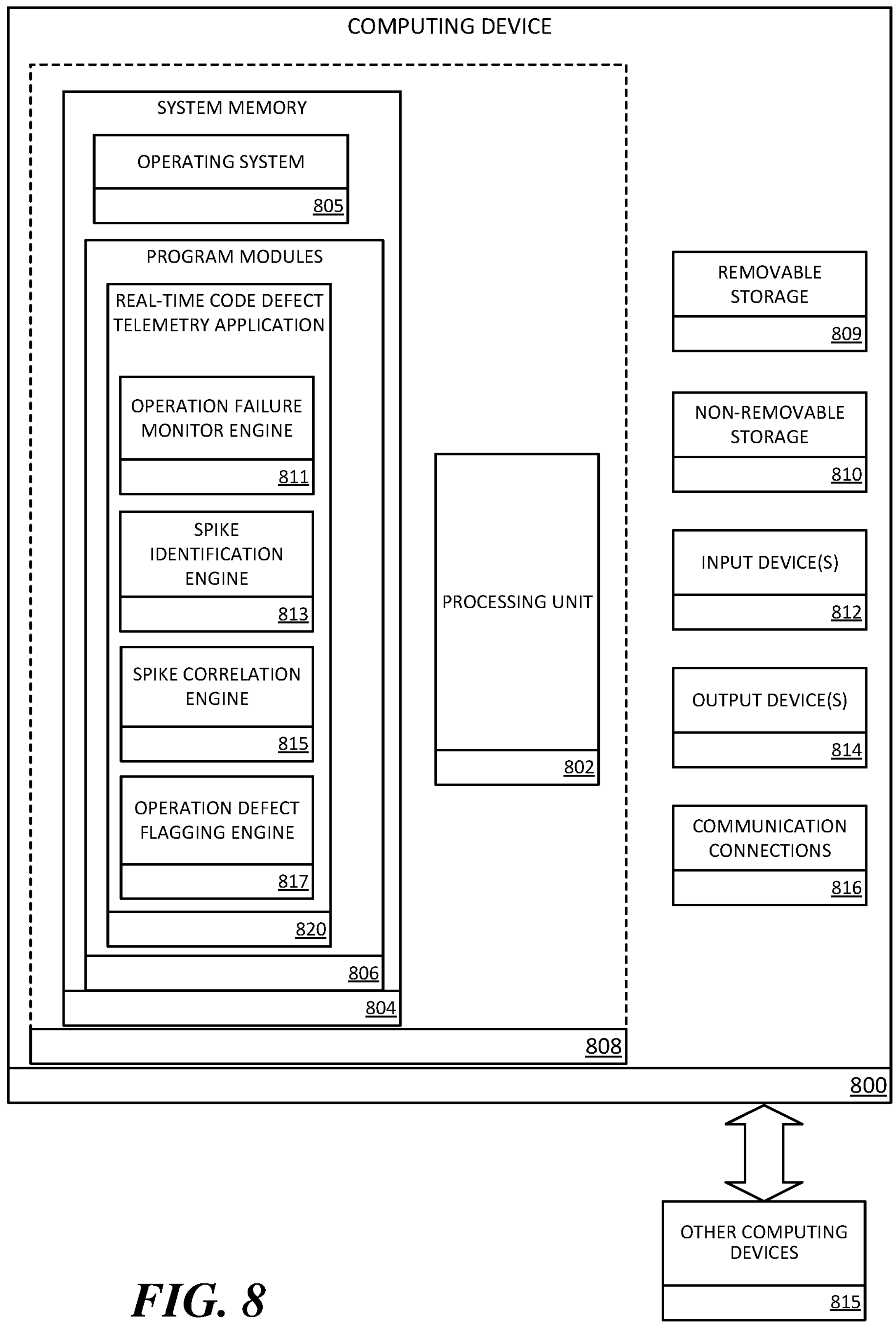
FIG. 8 is a block diagram illustrating example physical components of a computing device with which aspects of the disclosure may be practiced.

FIG. 8 is a block diagram illustrating physical components (e.g., hardware) of a computing device 800 with which aspects of the disclosure may be practiced. The computing device components described below may have computer executable instructions for detecting code defects associated with cloud-based application services. In a basic configuration, the computing device 800 may include at least one processing unit 802 and a system memory 804. Depending on the configuration and type of computing device, the system memory 804 may comprise, but is not limited to, volatile storage (e.g., random access memory), non-volatile storage (e.g., read-only memory), flash memory, or any combination of such memories. The system memory 804 may include an operating system 805 suitable for running one or more code defect system monitoring programs. The operating system 805, for example, may be suitable for controlling the operation of the computing device 800. Furthermore, embodiments of the disclosure may be practiced in conjunction with a graphics library, other operating systems, or any other application program and is not limited to any particular application or system. This basic configuration is illustrated in FIG. 8 by those components within a dashed line 808. The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage device 809 and a non-removable storage device 810.

As stated above, a number of program modules and data files may be stored in the system memory 804. While executing on the processing unit 802, the program modules 806 (e.g., real-time code defect telemetry application 820) may perform processes including, but not limited to, the aspects, as described herein. According to examples, the operation failure monitor engine 811 may provide notifications to a system monitor when one or more operations associated with a software build being executed occur. The notifications may include additional information about the failures, such as which user experienced the failure, which operation failed, whether the system crashed or otherwise malfunctioned, and the like. Spike identification engine 813 may determine whether a threshold number of operations occurred over a threshold duration of time in a given ring for a given operation and/or whether a threshold percentage of users experienced operation failures for a given operation over a threshold duration of time in a given ring. Spike correlation engine 815 may compare spiked data from current and previous software builds for the same and different development and production rings. Operation defect flagging engine 817 may perform one or more operations associated with notifying one or more users when a code defect has been identified as being related to operation failures in one or more development rings for a software build.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 800 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 800 may also have one or more input device(s) 812 such as a keyboard, a mouse, a pen, a sound or voice input device, a touch or swipe input device, etc. The output device(s) 814 such as a display, speakers, a printer, etc. may also be included. The aforementioned devices are examples and others may be used. The computing device 800 may include one or more communication connections 816 allowing communications with other computing devices 850. Examples of suitable communication connections 816 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. Any such computer storage media may be part of the computing device 800. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 9:
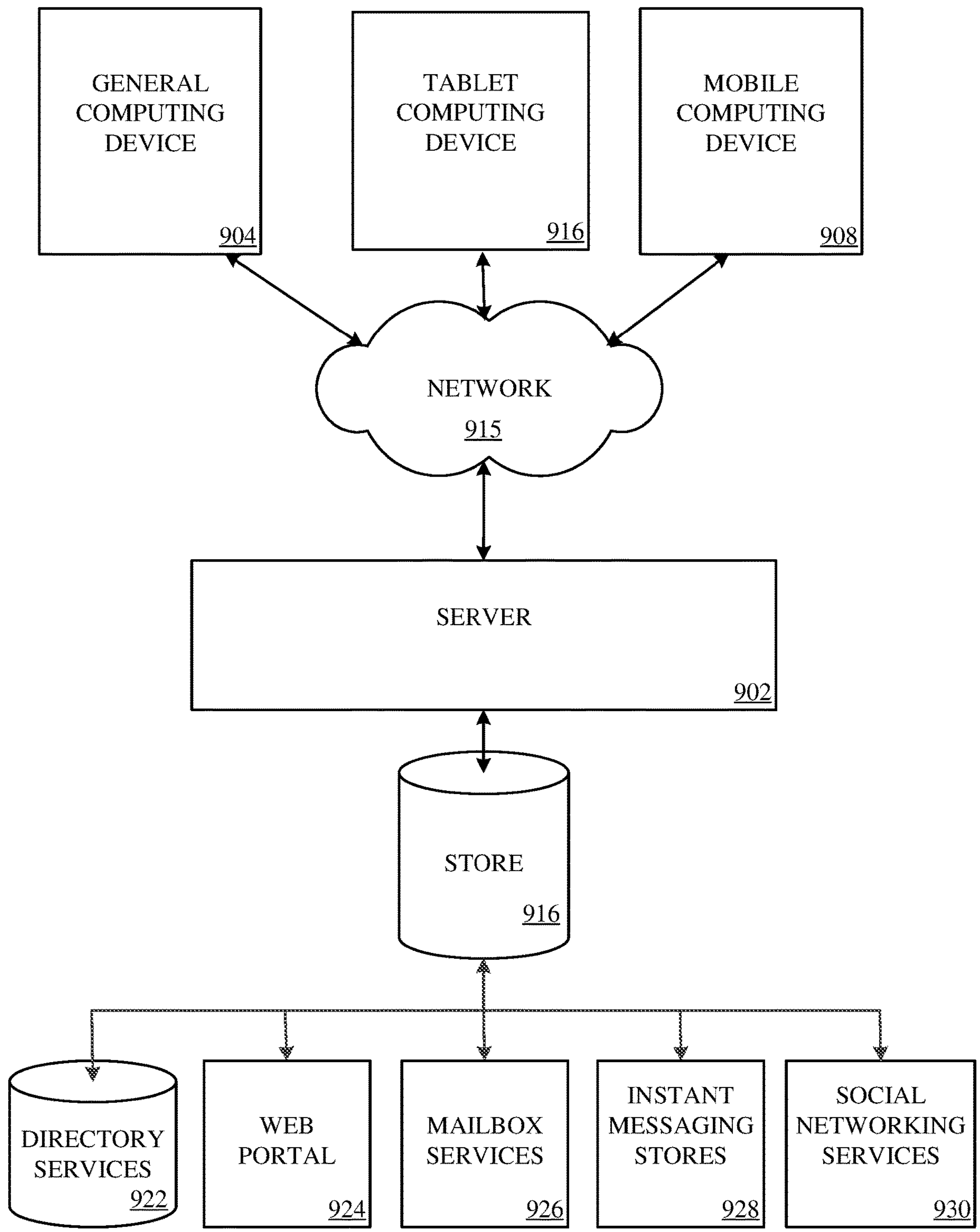
FIG. 9 is a simplified block diagram of a distributed computing system in which aspects of the present disclosure may be practiced.

FIG. 9 illustrates one aspect of the architecture of a system for processing data received at a computing system from a remote source, such as a personal/general computer 904, tablet computing device 906, or mobile computing device 908, as described above. Content displayed at server device 902 may be stored in different communication channels or other storage types. For example, various documents may be stored using a directory service 922, a web portal 924, a mailbox service 926, an instant messaging store 928, or a social networking site 930. The program modules 806 may be employed by a client that communicates with server device 902, and/or the program modules 806 may be employed by server device 902. The server device 902 may provide data to and from a client computing device such as a personal/general computer 904, a tablet computing device 906 and/or a mobile computing device 908 (e.g., a smart phone) through a network 915. By way of example, the computer system described above with respect to FIGS. 6-8 may be embodied in a personal/general computer 904, a tablet computing device 906 and/or a mobile computing device 908 (e.g., a smart phone). Any of these embodiments of the computing devices may obtain content from the store 916, in addition to receiving graphical data useable to be either pre-processed at a graphic-originating system, or post-processed at a receiving computing system.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A method for detecting a code defect associated with a cloud-based application service, the method comprising:

monitoring a plurality of operations associated with the cloud-based application service, the monitoring comprising:

analyzing data for a first development ring for a software build and data for a second development ring for the software build, wherein the data for the first development ring and the data for the second development ring is generated contemporaneously; and analyzing, in a previous version of the software build, data for a development ring corresponding to the first development ring and data for a development ring corresponding to the second development ring, wherein the data for the development ring corresponding to the first development ring in the previous version of the software build and the data for the development ring corresponding to the second development ring in the previous version of the software build is generated contemporaneously with the data for the first development ring and the data for the second development ring;

identifying, in the first development ring for the software build, a first failure spike comprising a first number of failures for a specific one of the plurality of operations, wherein the first failure spike occurred during a first temporal period;

identifying, in the second development ring for the software build, a second failure spike comprising a second number of failures, that is less than the first number of failures, for the specific one of the plurality of operations, wherein the second failure spike occurred during a second temporal period that overlaps with the first temporal period;

identifying a correlation between the first failure spike in the first development ring for the software build and the second failure spike in the second development ring for the software build, the correlation comprising a ratio of a number of operation failures for the specific one of the plurality of operations over a specific duration of time in the first development ring, to a number of operation failures for the specific one of the plurality of operations over a specified duration of time in the second development ring;

determining, for the previous version of the software build, that a failure spike for the specific one of the plurality of operations does not exist in the development ring corresponding to the first development ring;

determining, for the previous version of the software build, that a failure spike for the specific one of the plurality of operations does not exist in a development ring corresponding to the second development ring; and flagging the specific one of the plurality of operations as being related to the code defect.

2. The method of claim 1, further comprising determining, for the previous version of the software build, that an elevated level of errors associated with the specific one of the plurality of operations does not exist in a production environment.

3. The method of claim 1, wherein the first development ring is an outermost development ring.

4. The method of claim 3, wherein the outermost development ring is a last ring of testing for the software build prior to its release in a production environment.

5. The method of claim 1, wherein the second development ring is a development ring that precedes the first development ring.

6. The method of claim 5, wherein the second development ring is a development ring that immediately precedes the first development ring.

7. The method of claim 1, wherein identifying the first failure spike in the first development ring comprises determining that a threshold percentage of errors related to performance of the specific one of the plurality of operations have occurred.

8. The method of claim 1, wherein identifying the first failure spike in the first development ring comprises determining that a threshold number of errors, over a threshold amount of time, related to the performance of the specific one of the plurality of operations have occurred.

9. A system for detecting a code defect associated with a cloud-based application service, comprising:

a memory for storing executable program code; and one or more processors, functionally coupled to the memory, the one or more processors being responsive to computer-executable instructions contained in the program code and operative to:

analyze data for a first development ring for a software build and data for a second development ring for the software build, wherein the data for the first development ring and the data for the second development ring is generated contemporaneously;

analyze, in a previous version of the software build, data for a development ring corresponding to the first development ring and data for a development ring corresponding to the second development ring, wherein the data for the development ring corresponding to the first development ring in the previous version of the software build and the data for the development ring corresponding to the second development ring in the previous version of the software build is generated contemporaneously with the data for the first development ring and the data for the second development ring;

identify a correlation between a first operation failure spike comprising a first number of failures in the first development ring for the software build and a second operation failure spike comprising a second number of failures that is less than the first number of failures in the second development ring for the software build, wherein the first failure spike occurred during a first temporal period and the second failure spike occurred during a second temporal period that overlaps with the first temporal period, and wherein the correlation comprises a ratio of a number of operation failures for an operation over a specified duration of time in the first development ring, to a number of operation failures for the operation over a specified duration of time in the second development ring;

determine that an operation failure spike corresponding to the first operation failure spike did not exist for the previous version of the software build;

determine that an operation failure spike corresponding to the second operation failure spike did not exist for the previous version of the software build; and flag an operation associated with the failure spikes as being related to the code defect.

10. The system of claim 9, wherein the first development ring is an outermost development ring.

11. The system of claim 10, wherein the outermost development ring is a last ring of testing for the software build prior to its release in a production environment.

12. The system of claim 9, wherein the second development ring is a development ring that precedes the first development ring.

13. The system of claim 9, wherein the second development ring is a development ring that immediately precedes the first development ring.

14. A computer-readable storage media comprising executable instructions that, when executed by one or more processors, assists with detecting a code defect associated with a cloud-based application service, the computer-readable storage media including instructions executable by the one or more processors for:

monitoring a plurality of operations associated with the cloud-based application service, the monitoring comprising:

analyzing data for a first development ring for a software build and data for a second development ring for the software build, wherein the data for the first development ring and the data for the second development ring is generated contemporaneously;

analyzing, in a previous version of the software build, data for a development ring corresponding to the first development ring and data for a development ring corresponding to the second development ring, wherein the data for the development ring corresponding to the first development ring in the previous version of the software build and the data for the development ring corresponding to the second development ring in the previous version of the software build is generated contemporaneously with the data for the first development ring and the data for the second development ring;

identifying, in the first development ring for the software build, a first failure spike comprising a first number of failures for a specific one of the plurality of operations, wherein the first failure spike occurred during a first temporal period;

identifying, in the second development ring for the software build, a second failure spike comprising a second number of failures, that is less than the first number of failures, for the specific one of the plurality of operations, wherein the second failure spike occurred during a second temporal period that overlaps with the first temporal period;

identifying a correlation between the first failure spike in the first development ring for the software build and the second failure spike in the second development ring for the software build, the correlation comprising a ratio of a number of operation failures for the specific one of the plurality of operations over a specific duration of time in the first development ring, to a number of operation failures for the specific one of the plurality of operations over a specified duration of time in the second development ring;

determining, for the previous version of the software build, that a failure spike for the specific one of the plurality of operations does not exist in the development ring corresponding to the first development ring;

determining, for the previous version of the software build, that a failure spike for the specific one of the plurality of operations does not exist in a development ring corresponding to the second development ring; and flagging the specific one of the plurality of operations as being related to the code defect.

15. The computer-readable storage media of claim 14, wherein the first development ring is an outermost development ring comprising a last ring of testing for the software build prior to its release in a production environment.

16. The computer-readable storage media of claim 14, wherein the second development ring is a development ring that immediately precedes the first development ring.

17. The computer-readable storage media of claim 14, wherein identifying the first failure spike in the first development ring comprises determining that a threshold percentage of errors related to performance of the specific one of the plurality of operations have occurred over a threshold duration of time.

* * * * *